United States Patent

Ray

[15] 3,655,357
[45] Apr. 11, 1972

[54] BORON PHOSPHATE AS BORON SOURCE FOR PLANT LIFE

[72] Inventor: Louis F. Ray, West Carrollton, Ohio
[73] Assignee: Monsanto Company, St. Louis, Mo.
[22] Filed: July 22, 1969
[21] Appl. No.: 843,846

Related U.S. Application Data

[63] Continuation-in-part of Ser. No. 673,279, Oct. 6, 1967, abandoned.

[52] U.S. Cl. .................................71/1, 71/33, 71/64 SC
[51] Int. Cl. ..........................................C05b 17/00
[58] Field of Search ..................71/1, 33, 48, 128

[56] References Cited

UNITED STATES PATENTS

| | | | |
|---|---|---|---|
| 2,200,734 | 5/1940 | Arnold et al. | 260/465 |
| 3,244,500 | 4/1966 | Stinson et al. | 71/1 |
| 3,282,859 | 11/1966 | Baker et al. | 252/432 |

FOREIGN PATENTS OR APPLICATIONS

| | | | |
|---|---|---|---|
| 492,596 | 9/1938 | Great Britain | 71/48 |

OTHER PUBLICATIONS

Russel, Soil, (The Yearbook of Agriculture) 1957, U.S. Dept. Agr., Govt. Printing Office, Washington (1957) pp. 121– 128. S21, A35.

*Primary Examiner*—Charles N. Hart
*Attorney*—John W. Whisler, Stanley M. Tarter and Roy P. Wymbs

[57] ABSTRACT

Boron phosphate provides a boron source which slowly releases nutrient amounts of soluble boron in soil for plant assimilation.

5 Claims, No Drawings

BORON PHOSPHATE AS BORON SOURCE FOR PLANT LIFE

This application is a continuation-in-part of applicant's copending application Ser. No. 673,279, filed Oct. 6, 1967 and now abandoned.

BACKGROUND OF THE INVENTION

Boron is one of 12 mineral elements or nutrients required by plants for proper or normal growth. The plants absorb ions containing these elements by means of their root cells which are in contact with the soil or soil water according to the principles of ion or salt accumulation. Therefore, to be of value to plants, compounds which are added to the soil to supply mineral elements to plants must be capable of forming ions such as $NO^-_3$, $HPO^{--}_4$, $K+$, $B_4O^{--}_7$, etc. in soil. As used herein, the term "soluble boron" has reference to boron-containing ions or compounds which will form such ions, the term "boron phosphate compounds" has reference to boron phosphate or boron phosphate-containing compounds, and the term "normal plant growth" or "proper plant growth" has reference to plant growth resulting from a plant carrying out all of its functions or chemical transformations associated with growth in the expected manner, such as photosynthesis and respiration.

Growing plants ordinarily require that the soil or soil solution in which they grow contain only trace amounts of boron, i.e., from a few hundredths to 1 part per million. In many instances soil does not contain sufficient boron for normal plant growth, especially where boron has been removed therefrom by continual cultivation of seasonal crops. Thus, depending upon the boron content of a particular soil, fertilizer which contains boron salts is usually added to the soil to bring the boron concentration up to an adequate level for normal plant growth. Heretofore, boron compounds such as borax and colemanite have been used for this purpose. The initial solubility of borax is very high and relative small amounts thereof can cause toxicity to plants. On the other hand if low concentrations of borax are used, the level of boron in the soil falls below the level adequate for normal plant growth before the plant has matured. Another problem associated with using highly soluble boron compounds, such as borax, in sandy soils is that rain tends to rapidly leach soluble boron from the top soil so that most of the boron added in this form is lost. For example, 6 months after application of fertilizer borate ($Na_2B_4O_7 \cdot 5H_2O$) in Norfolk loamy sand, the boron is leached in appreciable quantity into the intermediate (8 to 16 inch) and lower (16 to 24 inch) zones and after twelve months most of the boron is leached past the 24-inch depth. Colemanite on the other hand, although initially less soluble than borax, forms lime in situ in soil. Excess amounts of lime adversely affects the availability of other essential nutrient elements needed by plants, and also causes adverse soil and plant conditions.

An object of the present invention therefore is to provide a boron source which slowly releases nutrient amounts of soluble boron in soil for plant assimilation.

Another object of the invention is to provide a boron source which is further characterized in that it can be added in relatively large amounts to soil without causing boron toxicity to plants.

A further object of the invention is to provide a boron source which is further characterized in that heavy rainfall will not rapidly leach the boron from porous top soil.

Still a further object of the invention is to provide a boron source of the type just described that is relatively inexpensive.

SUMMARY OF THE INVENTION

These and other objects of the invention are accomplished by using boron phosphate or the hydrates thereof as a boron source for providing nutrient amounts of soluble boron is soil for plant life assimilation. Boron phosphate possesses unique solubility characteristics; for example, when incorporated into soil, it slowly releases soluble boron over a period of time corresponding at least to the critical uptake period of the usual crop; e.g., cotton. Thus, the possibility of rainfall either washing the soluble boron from the soil surrounding the plant life or causing a soluble boron concentration in the soil which is toxic to plant life is minimized. Boron phosphate in this respect may be likened to a Spansule type medicament which is taken orally and slowly dissolves internally releasing active ingredients that are absorbed at a constant rate in the body's system for a determined period of time.

Boron phosphate may conveniently be produced according to the process described in U.S. Pat. No. 2,200,734 to Arnold and Lazier. The compound is used commercially as a catalyst in certain chemical processes, for example, in the manufacture of adiponitrile where adipic acid and ammonia in the vapor phase are passed at elevated temperatures, i.e. 300°–550° C., over boron phosphate. In this process the boron phosphate catalyst gradually becomes deactivated causing the yield of the desired product (adiponitrile) to become unacceptable. At this point the used or deactivated catalyst (commonly referred to as "spent" catalyst) is replaced with fresh catalyst.

Deactivated boron phosphate catalyst as well as fresh catalyst are suitable for use in the invention. The deactivated boron phosphate catalyst differs from fresh boron phosphate catalyst in that it contains carbonaceous by-product material which deposits on the surface of the catalyst during the process. The material comprises carbon, nitrogen and oxygen in combination and possibly other elements such as phosphorus and nitrogen which have a beneficial effect on plant life growth, thereby further increasing the desirability of using deactivated boron phosphate catalyst as a boron source for plant life. Moreover, the deactivated catalyst provides a relatively low cost source of boron phosphate since heretofore it has been considered a waste material.

The boron phosphate may be added to soil according to conventional techniques either per se or as a component of a fertilizer mix. The addition of deactivated boron phosphate catalyst during the processing of the fertilizer has the further advantage that it imparts a desirable grey color to the final fertilizer mix and also tends to aid in the granulation during the processing.

The amount of Boron phosphate which should be incorporated into a given soil to provide a nutrient amount of soluble Boron for normal growth of a given plant can easily be determined from the initial soluble boron concentration of the soil and from the boron requirements of the particular plant. The concentration of soluble boron in a soil resulting from the use of boron phosphate is, of course, directly proportional to the amount of the compound added thereto. The rate of soluble boron released in soil from a boron phosphate compound or any other boron compound can be determined from routine chemical analyses. If desired, boron phosphate may be added to soil in sufficiently large amounts to supply boron to plant life in herbicidal amounts.

Although boron phosphate is only sparingly soluble in water (25° C.), boron is released therefrom in soil. The release of boron from boron phosphate in soil is believed to result from chemical reactions initiated by substances in the soil, substances released by the plants, organisms in the soil, or by a combination thereof.

DESCRIPTION OF THE PREFERRED EMBODIMENT

The following examples are given for purposes of illustrating the invention and the invention is not intended to be limited to any specific compounds, compositions or ranges recited therein.

EXAMPLE 1

This example is given to illustrate a typical method for preparing boron phosphate.

1730 grams of 87% phosphoric acid ($H_3PO_4$) was placed in an enamel-lined vessel and stirred mechanically with a wooden paddle while sifting in slowly 824 grams of powdered boric acid ($H_3BO_3$—U.S.P. grade). The resulting mixture was then stirred continuously until the boric acid was completely disintegrated, and a smooth, viscous, taffy-like dough was formed. Agitation was then stopped and the charge was allowed to stand at room temperature for 18–20 hours during which time it set to a firm, gelatinous, mass. This product was then dried at 110° C. and baked for 4 hours at a temperature of 350° C. After baking, the hard, brittle, white product consisting essentially of boron phosphate was broken up and screened to a particle size of 8–14 mesh.

EXAMPLE 2

This example is given to illustrate one method of obtaining the deactivated or spent boron phosphate.

One and two-tenths cubic feet of the catalyst prepared as described above was charged into a multi-tubular converter and heated to 350° C. Adipic acid was vaporized and passed continuously over the catalyst at the rate of 15 lbs./hour, together with ammonia at the rate of 15 lbs./hour, together with ammonia at the rate of 14 lbs./hour. Under these conditions the molecular ratio of ammonia to adipic acid was 8 to 1, the space velocity was 280, and the time of contact was approximately 5.6 seconds. After approximately 200 hours, the reaction was discontinued and the catalyst recovered.

EXAMPLE 3

A greenhouse study was conducted to determine the availability of boron for young cotton plants from deactivated boron phosphate catalyst. The study consisted of four treatments as indicated in Table 1. Cotton was planted in Norfolk loamy sand, potted in one-gallon pots, with a uniform rate of 1,000 pounds of 4-12-12 (4% nitrogen — 12% phosphorus — 12% potassium) fertilizer per acre being thoroughly and homogeneously incorporated into the said sand. The boron phosphate, where added, was also incorporated into the soil and was added in the form of deactivated boron phosphate catalyst prepared according to the procedure of Example 2. Cotton was thinned to 10 plants per pot and was grown for 4 weeks. After the first two weeks, nitrogen was added at the rate of 50 pounds per acre. At the end of the four weeks, the cotton plants were harvested, dried, weighed and analyzed for boron. Soil samples were analyzed for available boron by the hot-water soluble procedure. The results of the study are given in Table 1.

described in Example 1. The results of the analyses are given in Table II.

TABLE II

CHEMICAL ANALYSIS

| | Deactivated $BPO_4$ Catalyst | | |
|---|---|---|---|
| | Outdoor Storage | | Directly from Process |
| | 6 Mo. Exposure | 1 Yr. Exposure | |
| Nitrogen | 1.26% * | — | 1.35% |
| Equivalent $NH_3$ | 1.54% * | — | 1.65% |
| Acid Soluble Boron | 8.33% * | 9.28% * | 7.94% |
| Water Soluble Phosphorus | 7.27% * | 2.95% * | 3.65% |
| Moisture (dried at 100°C.) | 24.47% | 15.2% | 0.15% |
| Total Boron (Emission Spectograph) | 11.6 % * | 11.94% * | 11.41% |
| Total Phosphorus (X-Ray Method) | 21.6 % | 23.3 % * | 23.4 % |

* Computed on dry weight basis.

The combined results shown in Tables I and II illustrate the unique solubility characteristics of boron phosphate, i.e., that although the compound is substantially unaffected by exposure to rain and other climatic conditions, it undergoes chemical changes in the soil whereby boron is slowly released therefrom in soluble form.

Although the examples have been directed to the use of the deactivated boron phosphate catalyst obtained from the nitrile synthesis process, any composition or material containing boron phosphate may be used, for example, boron phosphate containing varying degrees of water of hydration or boron phosphate combined with elements or salts thereof that also are valuable to plant life and growth such as sodium, potassium, magnesium, iron, nitrogen, barium, and the like, may also be employed. Also boron phosphate which has been used as a catalyst in other processes may be employed.

What is claimed is:

1. A method of slowly releasing nutrient amounts of soluble

TABLE I

| Run No. | Source of Boron | Boron added, lbs./acre | Wt. of plts. after harvest, g./pot | Boron conc. in plants, p.p.m. | Boron up-take of plts., mg. | Avail. Boron in soil after harvest, p.p.m. |
|---|---|---|---|---|---|---|
| 1 | None | None | 3.3 | 18.8 | 62.0 | 0.043 |
| 2 | $BPO_4$ incorp., in fertilizer | ¹ 1.0 | 3.7 | 60.0 | 222.0 | |
| 3 | $BPO_4$ added separately | ¹ 1.3 | 3.5 | 56.3 | 197.0 | 0.220 |
| 4 | $BPO_4$ added separately | ¹ 7.0 | 2.6 | 93.0 | 241.8 | 0.900 |

¹ Based on deactivated $BPO_4$ catalyst having an acid-soluble boron content of 7.85% as determined by A.O.A.C. Method 2.094 which is published in the book entitled "Official Methods Of Analysis Of The Association Of Official Agricultural Chemists" (Tenth Edition 1965); published by the Association of Official Agricultural Chemists, Washington, D.C.

The data of Table 1 clearly show that boron phosphate supplies soluble boron to plant life in nutrient amounts (Runs 2 and 3) or in herbicidal amounts when excessive amounts of the compound are used (Run 4).

EXAMPLE 4

Samples of deactivated boron phosphate catalyst were exposed to rain and other weather conditions for periods of 6 months and 1 year in an outdoor storage area. The samples were analyzed chemically at the end of its respective period. A sample of deactivated boron phosphate catalyst just removed from the adiponitrile process was also analyzed for purposes of comparison. The fresh catalyst from which the deactivated boron phosphate catalyst was obtained was prepared as boron in soil for plant assimilation which comprises treating the soil with a boron source selected from the group consisting of boron phosphate and hydrates thereof.

2. The process as defined in claim 1 wherein said boron source is the deactivated catalyst obtained from the adiponitrile synthesis process wherein gaseous ammonia and adipic acid vapors are passed at elevated temperatures over a catalyst consisting of boron phosphate.

3. The process as defined in claim 2 wherein said catalyst contains water of hydration.

4. The process as defined in claim 1 wherein said boron source is boron phosphate.

5. The process as defined in claim 4 wherein said boron phosphate contains water of hydration.

* * * * *